(12) United States Patent
Kill et al.

(10) Patent No.: US 6,955,186 B2
(45) Date of Patent: Oct. 18, 2005

(54) ELECTROMAGNETIC DOUBLE SWITCHING VALVE

(75) Inventors: Walter Kill, Friedrichshafen (DE); Jürgen Halter, Friedrichshafen (DE); Hubert Remmlinger, Friedrichshafen (DE); Karlheinz Mayr, Bregenz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/772,639

(22) Filed: Feb. 5, 2004

(65) Prior Publication Data

US 2004/0155215 A1 Aug. 12, 2004

(30) Foreign Application Priority Data

Feb. 8, 2003 (DE) .......................................... 103 05 157

(51) Int. Cl.[7] .............................................. F16K 31/02
(52) U.S. Cl. .................... 137/596.17; 137/870; 335/265
(58) Field of Search ............................ 137/596.17, 870; 335/265; 251/129.15

(56) References Cited

U.S. PATENT DOCUMENTS

| 3,378,031 | A | * | 4/1968 | Hatashita ............... 137/596.17 |
| 3,504,773 | A | * | 4/1970 | Miller ......................... 335/265 |
| 3,914,720 | A | * | 10/1975 | Drubig ........................ 335/265 |
| 3,961,298 | A | * | 6/1976 | Jaffe et al. ................... 335/265 |
| 3,963,049 | A | * | 6/1976 | Beauregard .................. 251/210 |
| 4,540,965 | A | * | 9/1985 | Hattori et al. ............... 335/265 |
| 4,559,971 | A | * | 12/1985 | Bradshaw .............. 137/596.17 |
| 5,083,590 | A | * | 1/1992 | Gattolliat et al. ............ 137/870 |
| 6,047,718 | A | * | 4/2000 | Konsky et al. .............. 335/265 |
| 6,572,077 | B1 | | 6/2003 | Wörner ................... 251/129.18 |

FOREIGN PATENT DOCUMENTS

| DE | 195 25 384 A1 | 1/1997 | ........... F16K/31/06 |
| DE | 198 26 076 C1 | 8/1999 | ........... F16K/17/04 |
| DE | 198 26 074 C1 | 3/2000 | ........... F16K/17/04 |

* cited by examiner

Primary Examiner—John Bastianelli
(74) Attorney, Agent, or Firm—Davis & Bujold, P.L.L.C.

(57) ABSTRACT

An electromagnetic dual-action control valve with a housing (2), with connections (15, 16, 17) for inflow and outflow lines for a pressure medium, with a solenoid (3) and with two armatures arranged to move within the solenoid (3) for opening and closing the line connections. To simplify the structure of such a dual-action control valve, it is provided that one of the armatures is formed as a hollow armature (4) with a closed end (11), within which an inner armature (5) is arranged to move coaxially, and the hollow armature (4) has openings (20, 21) for the pressure medium, of which one opening (21) can be closed by a sealing surface (13) of the inner armature (5).

12 Claims, 6 Drawing Sheets

ELECTROMAGNETIC DOUBLE SWITCHING VALVE

This application claims priority from German Application Ser. No. 103 05 157.0 filed Feb. 8, 2003.

FIELD OF THE INVENTION

The invention concerns an electromagnetic dual-action control valve.

BACKGROUND OF THE INVENTION

A dual-action control valve designed as a safety valve for gas equipment is known from DE 195 25 384 A1. In this dual-action control valve a single flow path is opened or closed by the blocking valves arranged in series one after the other, to enable rapid closing of the flow path while maintaining safety criteria. The armature of one of the two valves can be displaced coaxially inside the armature of the other valve formed as a hollow armature and both armatures can move inside an electromagnetic solenoid.

The hollow armature and the inner armature act directly, i.e., without any intermediate valve tappet, each on a valve disk by means of which two separate gas spaces arranged one after the other along the flow can be closed. For this, the two valve disks rest against different sections of the valve housing, each being held by restoring springs arranged one behind the other.

According to the document in question, such a dual-action safety valve can be used advantageously for the operation of a gas burner. For this, the two valve stages can for example be opened or closed one after the other, so that perhaps when starting the burner only a small amount of gas is supplied at first, and subsequently a larger amount of gas. A disadvantage of this dual safety valve is that its structure necessary for the operation of a gas burner is possibly rather complex from the standpoint of safety.

Against this background, the purpose of the present invention is to provide an electromagnetic dual-action control valve with a considerably more simple structure.

SUMMARY OF THE INVENTION

According to these, the dual-action control valve of the invention consists of a valve housing in which is arranged at least one magnetic solenoid, inside which are inserted two armatures that can be moved by the magnetic forces of the solenoid. In addition, each armature is associated with a restoring spring, these springs resting at one end against the inside of the valve housing and, at the other end, against the respective ends of the two armatures.

Also arranged on the valve housing are connections for lines carrying a pressure medium, and these connections can be closed by at least one of the two armatures. For this, the armatures have sealing surfaces which come in contact with correspondingly arranged seal seat surfaces on the inside of the valve housing.

In this dual-action control valve, it is now provided that one of the two armatures is made as a hollow armature with one open and one closed end, within which the second armature can move coaxially relative to the hollow armature. In addition, it is provided that the hollow armature has openings to allow the passage of the pressure medium, and one of these openings can be closed by a sealing surface on the inner armature. Preferably, the opening that can be closed by the inner armature is formed in the otherwise closed end face of the hollow armature.

In a further development of the invention, it is provided that the two restoring springs are arranged coaxially to one another, and that the spring for the hollow armature rests against the end of this armature located opposite the end face thereof that can be closed.

In contrast, the second restoring spring is arranged against the end of the inner armature located opposite the end with the sealing surfaces by means of which the said openings in the hollow armature can be closed.

In another embodiment of the invention, it is provided that at its end associated with the restoring spring, the inner armature has a sealing surface by means of which a line connection, preferably the connection for a return line for the pressure medium, can be closed.

To produce a control pressure that can be actuated in two steps, it is provided that the openings in the hollow armature have a smaller cross-sectional area than the cross-sectional area of the connection for the pressure line and that of the connection for the control pressure line.

Furthermore, the dual-action control valve, according to the invention, for example, can be made as a clutch control valve and will, in this case, have a connection for a pressure line, a connection for a return line and a connection for a control pressure line. In other embodiments of the invention, according to the invention, the valve is made as a switching or fixed-cycle valve, in which no connection for a return line need be provided. The valve structure with two valves in a common housing can, therefore, be used not only for 3/2-way valves, but also for other multi-way valves.

In another development of the invention, the dual-action control valve is designed such that the two armatures are arranged axially one behind the other, a first armature having an axial bore preferably directed coaxially to the connection for the pressure line. In addition, this hollow armature has a first sealing surface by means of the connection for the pressure line can be closed. Moreover, at its end opposite the said first sealing surface this hollow armature has a second sealing surface, against a first end face of the second armature facing the hollow armature can be brought into contact in such a manner that the said bore is closed. Finally, on the side of the second armature facing away from the hollow armature, a second sealing surface is formed by means of a connection for a return line can be closed.

In all these dual-action control valves, it can additionally be provided that between the sealing surfaces and the ends of the armatures or the valve housing, respectively, sealing means, preferably sealing rings are arranged, which facilitate pressure-tight contact between the respective components in each case.

Finally, it is found advantageous for the second armature of the last mentioned dual-action control valve to be guided by a section of the housing, enabling in particular an exact axial movement of this armature and thus improving the sealing action of the sealing surfaces and/or the sealing means.

BRIEF DESCRIPTION OF THE DRAWINGS

The invention will now be described, by way of example, with reference to accompanying drawings in which.

DETAILED DESCRIPTION OF THE INVENTION

Figure 1:
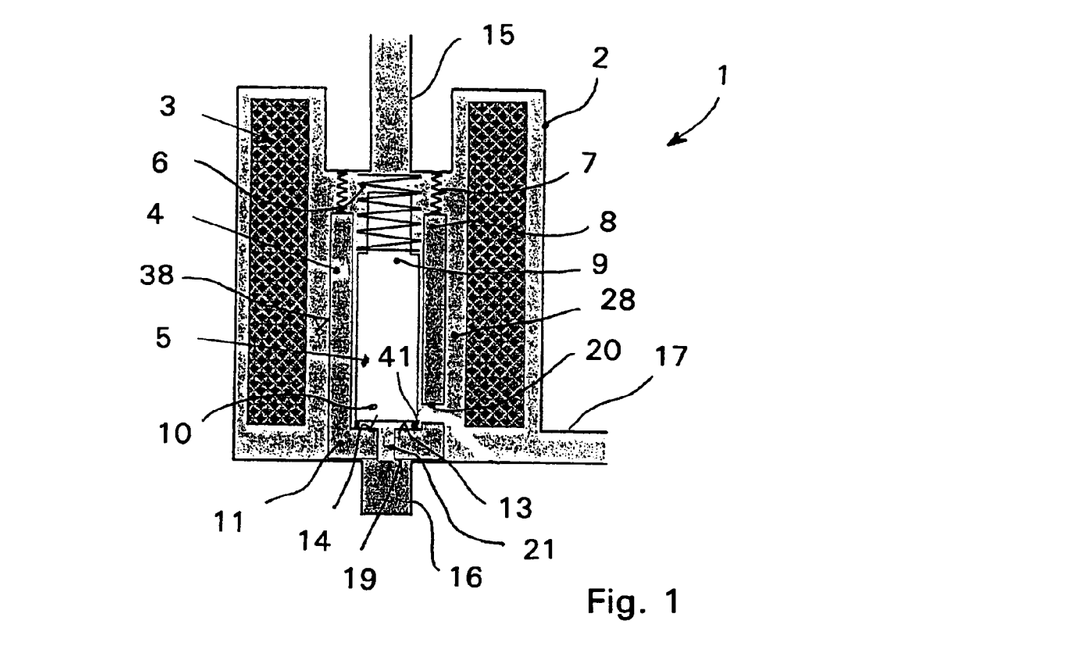
FIG. 1 is a schematic cross-section through a dual-action control valve in a first actuation position.

The schematic cross-sectional representation of FIG. 1 shows that a dual-action control valve 1, according to the invention, has a comparatively simple structure which is easy to understand. It consists first of a valve housing 2 in whose inside space 28, which can be filled with a pressure medium, is arranged a hollow-cylindrical electromagnetic solenoid 3 which surrounds two axially movable armatures. One of these two armatures is made as a hollow armature 4, inside which an inner armature 5 is arranged coaxially with the hollow armature 4 and the solenoid 3, and is able to move within them.

In a manner known as such, the two armatures 4, 5 can be moved by the magnetic forces produced by the solenoid 3, and the two armatures 4, 5 rest at one end, each via a respective restoring spring 6, 7, against a housing wall 12 of the housing 2. The two springs 6, 7 are also arranged coaxially with one another, so that the spring 6 associated with the inner armature 5 rests with its other end against a side 9 of the inner armature 5 which is associated with a tube connection 15 of the valve housing 2. This connection 15 is in the present example designed to connect to a return line for the pressure medium. In contrast, the other end of the spring 7 rests against the open end face of the hollow armature 4, which is also located in the area of said connection 15 for the return line.

At the end of the hollow armature 4 facing away from the spring 7, the armature has a largely closed end 11 which, in this case, has only one opening 21 to allow passage of the pressure medium. In addition, a further opening 20 can be seen in a sidewall 38 of the hollow armature 4, through which the pressure medium can flow out of the hollow space of the hollow cylinder 4 into the inside space 28 of the valve housing 2.

The dual-action control valve 1 in FIG. 1 is shown in an operating condition in which the solenoid 3 is not energized with current, so that no magnetic forces act on the two armatures 4, 5. In this situation, the spring 7 presses the hollow armature 4 with its end sealing surface 19 against a seal seat surface 18 on the inside wall of the valve housing 2, which is associated with a connection 16 for a pressure line. Furthermore, in this situation the inner armature 5 is pressed by the spring 6 with one of its ends against a seal seat surface 14 on the inside of the hollow armature 4, so that by virtue of the inner armature 5 and an end sealing surface 13 the opening 21 in the hollow cylinder 4 is at least partly, but preferably completely closed.

Accordingly, the hollow armature 4 and the inner armature 5 close the pressure medium flow path from the pressure line connection 16 to a connection 17 for a control pressure line. To improve the sealing, sealing means such as sealing rings 40, 41 or valve disks (not shown here) can be arranged on the respective end faces of the two armatures 4, 5.

Figure 2:
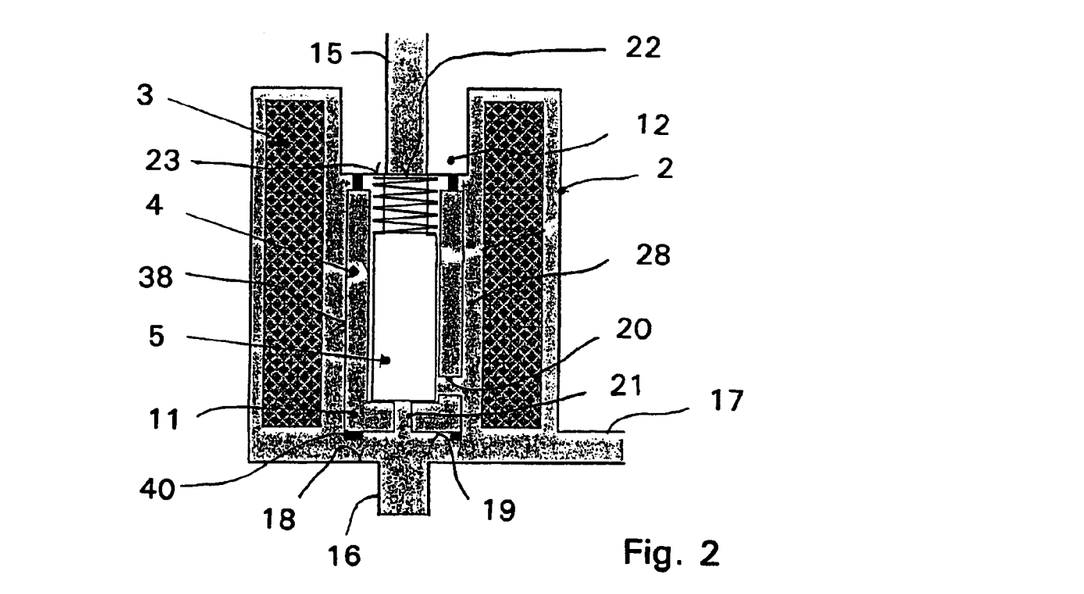
FIG. 2 is a dual-action control valve as in FIG. 1, but in a second actuation position.

FIG. 2 shows the dual-action control valve 1 in the operating condition in which the solenoid 3 is energized with the maximum current envisaged. Due to the magnetic forces acting on the armatures 4, 5, both armatures are displaced upward against the restoring forces of the springs 6, 7, so that the flow path from the pressure line connection 16 to the control pressure line connection 17 is completely open. In contrast to the operating situation shown in FIG. 1, now however, now the connection 15 for the return line is completely blocked by the inner armature 5, since a sealing surface 22 of the latter is against an associated seal seat surface 23 of the connection 15. FIG. 2 also clearly shows the sealing means 40 arranged on the end 11 of the hollow armature 4.

Figure 3:
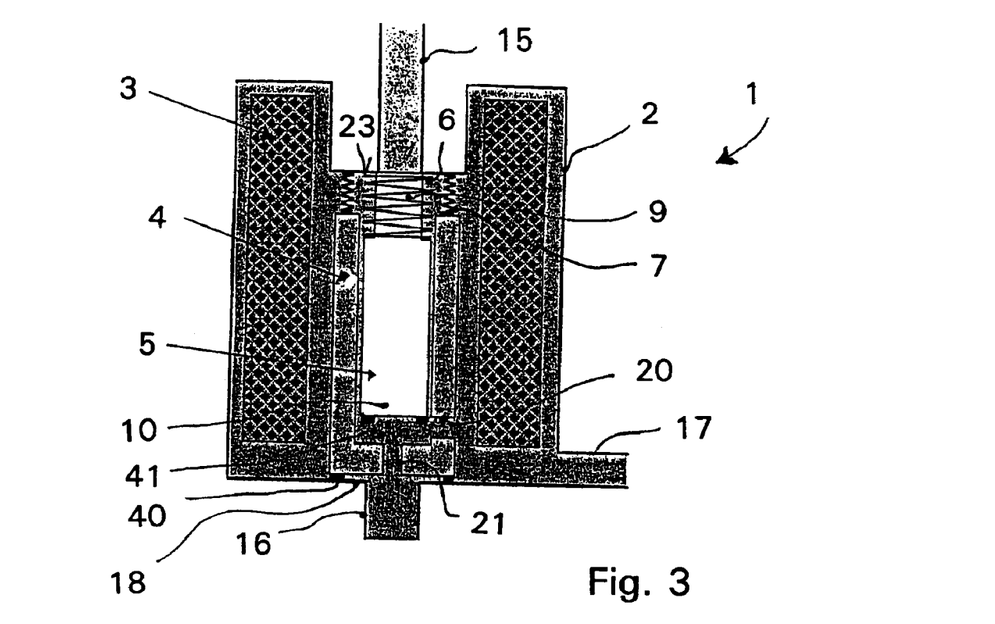
FIG. 3 is a dual-action control valve as in FIG. 1, in a third actuation position.

In the operating condition shown in FIG. 3, the solenoid 3 of the dual-action control valve 1 is only energized with a small current, so that the hollow armature 4 is still pressed by the restoring force of the spring 7 against the sealing surface 18 of the valve housing 2. In contrast, due to the magnetic force, the inner armature 5 is pressed against the restoring force of the spring 6 so that its spring-side end 9 is in contact with the seal seat surface 23 on the connection 15 for the return line, so that the flow path to the return line 15 is closed. In this operating situation, however, an end 10 of the inner armature 5 leaves open the openings 20, 21 to the connection 16 for the pressure line and to the connection 17 for the control pressure lie, so that a smaller flow path is open for the pressure medium.

Such energizing of the dual-action control valve 1 is appropriate for an operating situation in which, for example, finely controlled filling of a control cylinder is desired, whereas for rapid filling the solenoid 3 is energized as in FIG. 2. This makes it clear that the two armatures, 4,5 can be actuated separately from one another.

Figure 4:
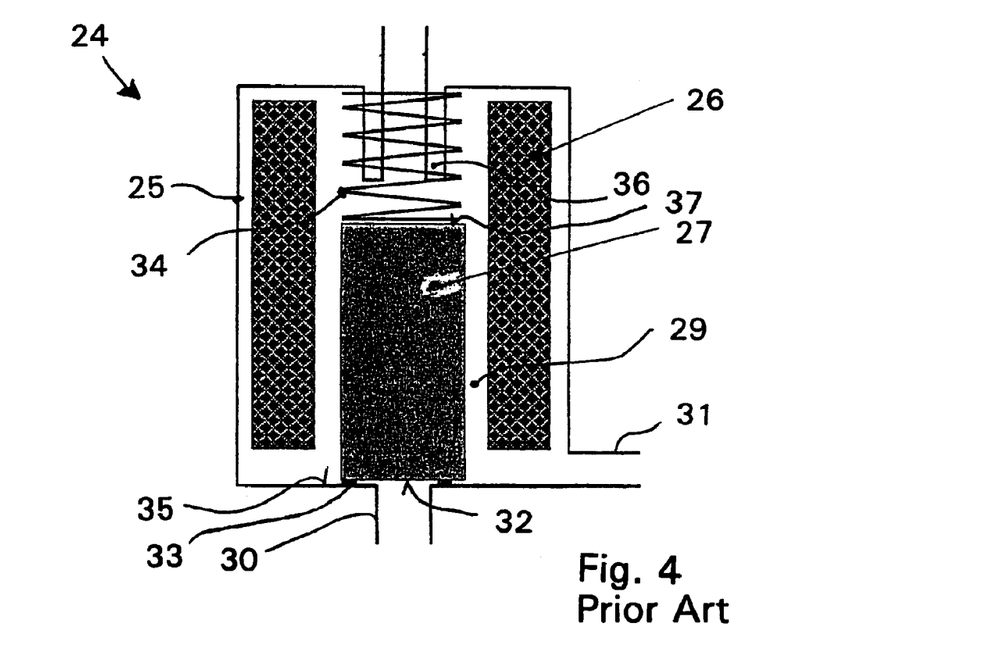
FIG. 4 is a single-action control valve according to the prior art.

For comparison, FIG. 4 shows a single-action control valve 24 of the prior art. A control valve 24 consists of a valve housing 25, inside which a solenoid 26 is fixed. Coaxially inside the solenoid 26 is arranged an armature 27, which can be moved coaxially by the magnetic force of the solenoid 26 against the force of the restoring spring 34 positioned on one of its end faces. When the solenoid 26 is energized, the armature 27 is pressed upward with the sealing surface 37 on the end associated with the restoring spring 34 against a connection 36 for a return line, so that the latter is blocked for a pressure medium present in the valve housing 25. However, in this operating condition (not illustrated here), a flow path is opened between a connection 30 for a pressure line and a connection 31 for a control pressure line.

In the operating situation of the single-action control valve 24 (shown in FIG. 4), the solenoid 26 is not energized, so that the restoring spring 34 presses an end face 32 of the armature 27 opposite the spring 34 against a seal seat surface 35 of the valve housing 25. In this way, on an inside space 29 of the valve housing the flow path from the connection 30 for a pressure line to the connection 31 for a control pressure line is blocked and the flow path from the connection 31 for the control pressure line to the connection 36 for the return line is opened.

In this single-action control valve 24 as well, separate sealing means 33 can be used, which are arranged or formed on the end face 32 of the armature 27 or on the seal seat surface 35.

A comparison of the structure of the dual-action control valve of FIG. 3 with that of the known single-action control valve 24 of FIG. 4 shows clearly that the dual-action control function can be produced without major constructive complexity, by exchanging the armature of the prior art for the hollow armature and the inner armature according to the invention, with the restoring springs, respectively, associated with them and sized appropriately for their respective purposes.

Figure 5:
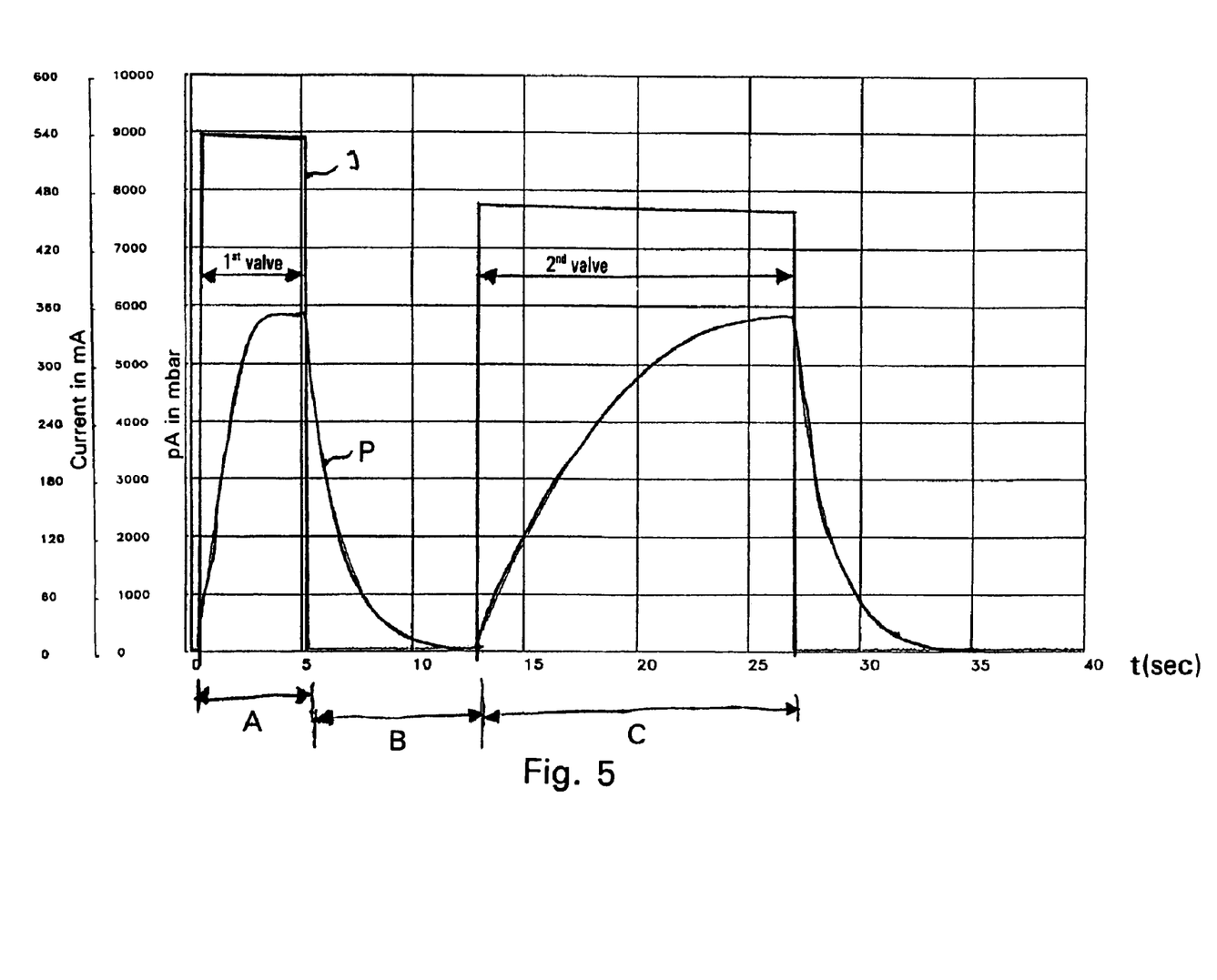
FIG. 5 is a diagram showing the time variation of the solenoid current and control pressure of the dual-action control valve when the respective valve steps are actuated.

The functions and operating behavior of the dual-action control valve, according to the invention, are made clear by FIGS. 5 through 8. FIG. 5 shows the time variation of a solenoid current I and the response of the dual-action control valve in relation to the control pressure pA present in the connection 17 for the control pressure line. In the first energizing phase A shown in FIG. 5, the solenoid 3 is energized with a high current I, which is sufficient to raise the hollow armature 4 together with the inner armature 5 against the force of the restoring springs 6, 7 until the connection 15 for the return line is closed. As FIG. 2 also shows, this opens up a high-capacity flow path between the connection 16 for the pressure line and the connection 17 for the control pressure line, so that the build-up of the pressure pA is comparatively more rapid. At the end of the energizing phase A, the control pressure pA falls to zero during a de-energized phase B.

In the actuation position of the second energizing phase C also shown in FIG. 3, the solenoid 3 receives a somewhat smaller solenoid current I which is only sufficient to raise the inner armature 5 against the restoring force of the spring 7 as far as the connection 15 for the return line, so that the opening 20 of the hollow armature 4 is also left open. In this way, inside the valve inner space 28, a flow path of lesser capacity is opened between the connection 16 for the pressure line and the connection 17 for the control pressure line. Accordingly, for as long as the solenoid current I is applied, there occurs a comparatively slower build-up of the control pressure pA in the connection 17 for the control pressure line.

Figure 6:
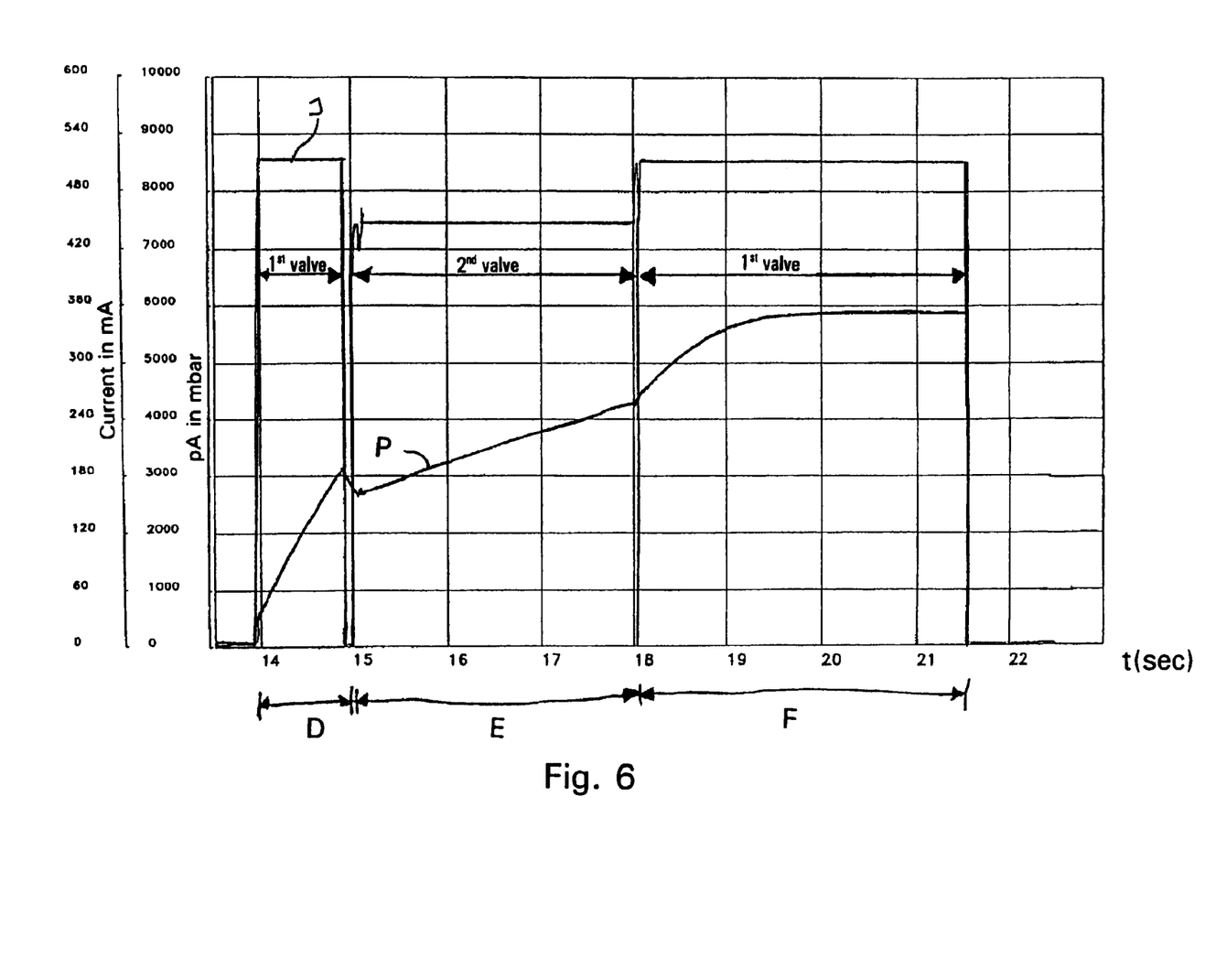
FIG. 6 is a diagram as in FIG. 5, but during the multiple actuation of one of the valve steps during a filling process of a control cylinder.

The energizing and pressure variation shown in FIG. 6 illustrates a typical filling process of a cylinder of a hydraulic or pneumatic piston-cylinder arrangement. In a first phase D a higher solenoid current I is used, so as to provide a flow path of high capacity between the connection 16 for the pressure line and the connection 17 for the control pressure line, by raising the hollow armature 4 as in FIG. 2. Correspondingly, the cylinder undergoes rapid pre-filling to a preselected pressure level or a predetermined piston position.

In the subsequent fine-control filling phase E, the solenoid current I is reduced down to a level such that the hollow armature 4 blocks the main flow path and, as in FIG. 3, the still raised inner armature 5 leaves open the flow path of smaller capacity between the connection 16 for the pressure line and the connection 17 for the control pressure line. In this phase, fine control of the piston adjustment path or the pressure level at which the piston acts on a device can take place.

Then, in phase F, the solenoid current I is increased again so that the hollow armature 4 once more opens up said main flow path and another rapid-filling phase takes place. In this phase, for example, the piston or a brake is actuated and a constant pressure level is produced for as long as the solenoid remains energized.

Figure 7:
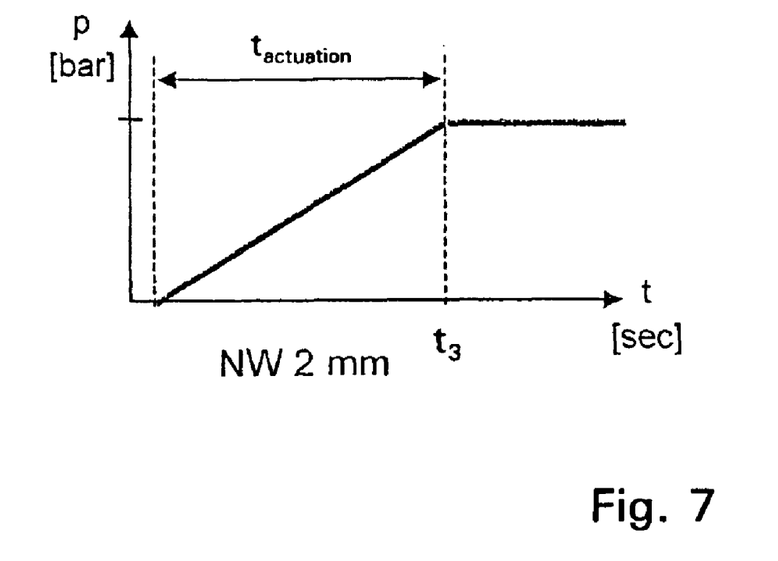
FIG. 7 is a diagram of the pressure variation during a control cylinder filling process, with a control valve of the prior art as in FIG. 4.
Figure 8:
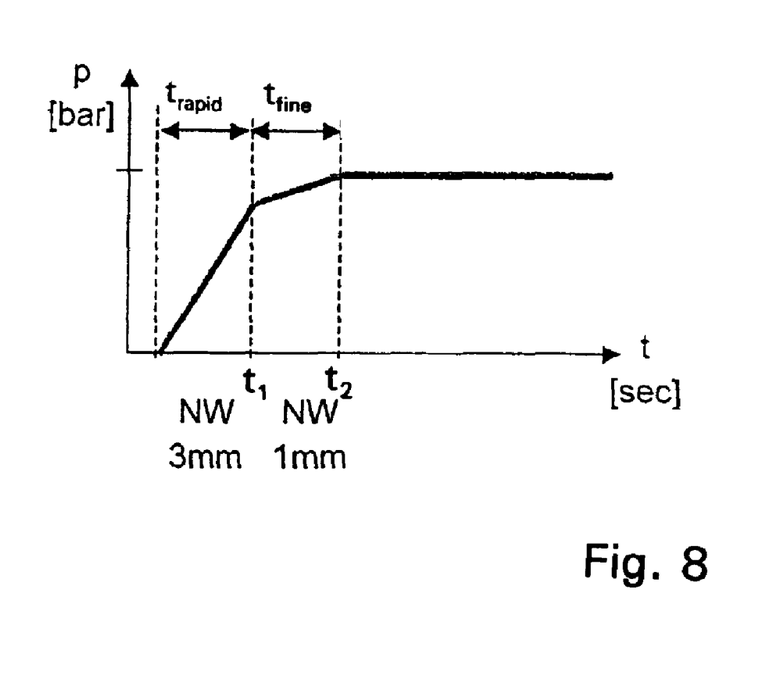
FIG. 8 is a diagram as in FIG. 7, but when a dual-action control valve is used.

Finally, FIGS. 7 and 8 show a comparison of the filling times for a cylinder of a piston-cylinder arrangement which is supplied with actuating pressure in accordance with the pressure variation of FIG. 7 via a conventional, single-action control valve 24 and in accordance with the pressure variation of FIG. 8 via the dual-action control valve 1 of the invention. From this, it can be seen clearly that with the conventional control valve (in this case having a flow cross-section diameter of 2 mm) only one valve actuation process is possible and a time $t_3$ flapses before a predetermined pressure pA is reached.

In contrast, the pressure variation attainable with the dual-action control valve 1 according to the invention is different and much more advantageous. In this case, by means of the first valve with a nominal width of 3 mm a rapid pre-filling phase ($t_{rapid}$) can be actuated, followed by a fine control filling phase ($t_{fine}$) by means of the second valve with nominal width 1 mm. As shown clearly by the comparison between FIGS. 7 and 8, this results in a total filling time $t_2$ which is appreciably shorter than the total filling time of FIG. 7 with a single-action control valve of the prior art.

A further advantage of the two-stage control of piston-cylinder arrangements, is that this greatly reduces the high mechanical loading due to the piston's impact when it reaches its end position.

Figure 9:
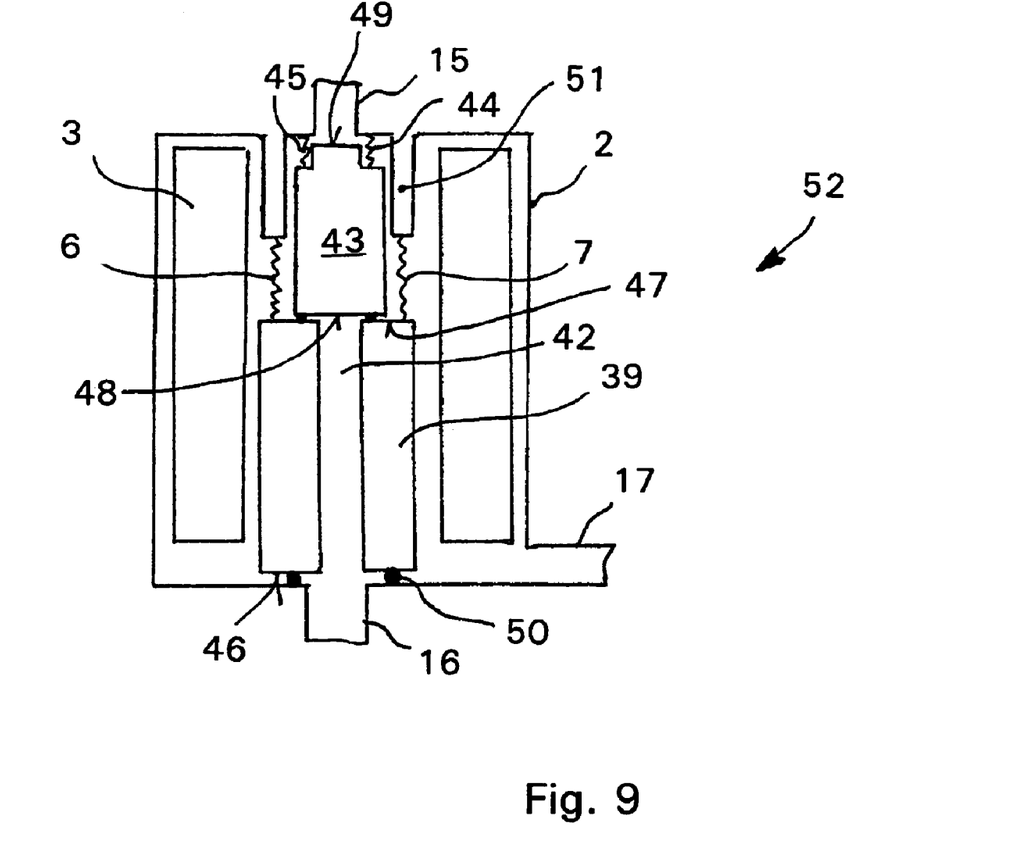
FIG. 9 is another embodiment of the dual-action control valve with armatures arranged axially one behind the other.

Finally, FIG. 9 shows another design of a dual-action control valve 52 according to the invention, in which, making use of the core concept of the invention, two armatures 39, 43 are arranged axially one behind the other in the valve housing 2. One armature 39 is made as a hollow armature with an axial bore 42 directed coaxially to the connection 16 for the pressure line. At its end facing the connection 16, the hollow armature 39 has a sealing surface 46 by means of which the bore 42 can be closed off from the inside space of the valve housing in a pressure-tight way.

At the opposite end of the hollow armature 39 is formed a second sealing surface 47, against which the second armature 43 can be brought in contact so that the bore 42 is sealed. In addition, on the end of the second armature 43 facing away from the hollow armature 39 another sealing surface 49 is formed by means of a connection 15 for a pressure medium return line can be closed.

Further, at the end faces of the two armatures 39, 43 restoring springs 6, 44, 45 are provided, which push these armatures to a position which closes off the connection 16 for the pressure line when the solenoid 3 is not energized.

Since the diameter of the bore 42 in the hollow armature 39 is smaller than the diameter of the connection 16 for the pressure line, depending on the flow path opened precisely by virtue of the variable energizing of the solenoid 3, volume flows of different magnitude can be passed through the valve 52.

To improve the sealing action of the sealing surfaces, in the dual-action control valve 52 last described it can again be provided that between the sealing surfaces and the ends of the armatures 39, 43 or on the valve housing 2 sealing means 50 are arranged, preferably in the form of sealing rings. In addition, a separate section 51 of the housing ensures that the second armature 43 is properly guided axially.

REFERENCE NUMERALS 1 dual-action control valve
2 valve housing
3 solenoid
4 hollow armature
5 inner armature 6 restoring spring
7 restoring spring
8 open end of the hollow armature
9 end of the inner armature on the spring side
10 end of the inner armature on the opening side
11 closed end of the hollow armature
12 housing wall
13 sealing surface on the inner armature
14 seal seat surface on the hollow armature
15 connection for a return line
16 connection for a pressure line
17 connection for a control pressure line
18 seal seat surface on the valve housing
19 sealing surface on the outside of the hollow armature
20 opening
21 opening
22 sealing surface on the inner armature for the return line connection
23 seal seat on the return line connection
24 single-action valve of the prior art
25 valve housing
26 solenoid
27 armature
28 inside space of the dual-action control valve
29 inside space of the single-action valve
30 connection for a pressure line
31 connection for a control pressure line
32 end face of the armature
33 sealing means
34 restoring spring
35 seal seat of the housing
36 connection for a return line
37 sealing surface on the armature for the return line connection
38 sidewall of the hollow armature
39 hollow armature; first armature
40 sealing means
41 sealing means
42 bore
43 second armature
44 restoring spring
45 restoring spring
46 sealing surface
47 sealing surface
48 end face
49 sealing surface
50 sealing means
51 section of housing
52 dual-action control valve
I electric current
pA pressure
t time
NW nominal width

What is claimed is:

1. An electromagnetic dual-action control valve (1) having a valve housing (2), with at least one magnetic solenoid (3) arranged in the valve housing, with two armatures (4, 5) arranged coaxially to one another, with respective restoring springs (6, 7) associated with each of the two armatures (4, 5), with line connections (15, 16, 17) for lines carrying a pressure medium and with sealing surfaces on the two armatures (4, 5) that can be moved by magnetic force so as to close or open the line connections (15, 16, 17), wherein a first one of the two armatures is formed as a hollow armature (4) with a closed end face (11), inside the hollow armature (4) which is arranged an inner armature (5) which can move coaxially thereto, and the hollow armature (4) has at least first and second openings (20, 21) for the pressure medium, of which the first opening (21) can be closed by a sealing surface (13) of the inner armature (5).

2. The electromagnetic dual-action control valve according to claim 1, wherein the first opening (21) is formed in the closed end face (11) of the hollow armature (4).

3. The electromagnetic dual-action control valve according to claim 1, wherein the restoring spring (7) for the hollow armature (4) is arranged at an end (8) of the hollow armature (4) which is opposite to the closed end (11).

4. The electromagnetic dual-action control valve according to claim 1, wherein the restoring spring (6) for the inner armature (5) is arranged at an end (9) of the inner armature (5) which is opposite to the sealing surface (13) for closing the opening (21) of the hollow armature (4).

5. The electromagnetic dual-action control valve according to claim 1, wherein the dual-action control valve (1, 52) is formed as a clutch control valve, which has a first connection (16) for a pressure line, a second connection (15) for a return line and a second connection (17) for a control pressure line.

6. The electromagnetic dual-action control valve according to claim 1, wherein the dual-action control valve (1, 52) is formed as one of a switching or fixed-cycle valve, which has a first connection (16) for a pressure line, a second connection (15) for a return line and a third connection (17) for a control pressure line.

7. The electromagnetic dual-action control valve according to claim 1, wherein at an end (9) associated with the restoring spring (6), the inner armature (5) has an end sealing surface (22) by means of which a line connection (15) can be closed.

8. The electromagnetic dual-action control valve according to claim 7, wherein the line connection (15) for a back-flow or return line can be closed by the end sealing surface (22) of the inner armature (5) nearest the restoring spring.

9. The electromagnetic dual-action control valve according to claim 1, wherein the first opening (21) in the hollow armature (4) has a smaller cross-sectional area than cross-sectional areas of the connection (16) for at least one of the pressure line and the connection (17) for the control pressure line.

10. The electromagnetic dual-action control valve according to claim 1, wherein the two armatures (39, 43) are arranged axially one behind the other, one armature is formed as a hollow armature (39) with an axial bore (42), the axial bore (42) is directed coaxially to the connection (16) for a pressure line, the hollow armature (39) has first sealing surface (46) by means of which the connection (16) can be closed in a pressure-tight way, and at an end of the hollow armature (39) opposite the first sealing surface (46) is formed a second sealing surface (47), against which the first end face (48) of the second armature (43) facing toward the hollow armature (39) can be brought into contact to close off the axial bore (42), and the second armature (43) has at an end facing away from the hollow armature (39), a second sealing surface (49), by means of which a further connection (15) for a return line can be closed.

11. The electromagnetic dual-action control valve according to claim 1, wherein between one of the sealing surfaces and the ends of the armatures (39, 43) or the valve housing (2) are arranged sealing means (50), preferably sealing rings.

12. The electromagnetic dual-action control valve according to claim 1, wherein a second armature (43) is guided axially by a section (51) of the housing.

* * * * *